United States Patent [19]

Roberts et al.

[11] Patent Number: 4,858,815
[45] Date of Patent: Aug. 22, 1989

[54] FRICTION WELDER MECHANISM

[75] Inventors: Derek A. Roberts; John W. Daines, both of Bristol, England

[73] Assignee: Rolls Royce plc, London, England

[21] Appl. No.: 222,415

[22] Filed: Jul. 21, 1988

[30] Foreign Application Priority Data

Aug. 1, 1987 [GB] United Kingdom ................ 8718268

[51] Int. Cl.$^4$ ............................................ B23K 20/12
[52] U.S. Cl. ........................................ 228/2; 228/112; 74/836; 74/571 M; 474/900
[58] Field of Search ............................ 228/2, 112, 114; 74/835, 836, 571 M; 474/900

[56] References Cited

U.S. PATENT DOCUMENTS

| 517,807 | 4/1894 | Moore | 74/835 |
|---|---|---|---|
| 3,732,613 | 5/1973 | Stiegerwald | 228/112 |
| 3,734,383 | 5/1973 | Ritter et al. | 228/112 |
| 3,771,706 | 11/1973 | Martens et al. | 228/112 |
| 4,058,421 | 11/1977 | Summo | 228/112 |
| 4,249,424 | 2/1981 | Glazier | 74/836 |
| 4,739,676 | 4/1988 | Ullmann et al. | 74/571 M |

FOREIGN PATENT DOCUMENTS 1293532 10/1972 United Kingdom ................ 228/112
1385471 2/1975 United Kingdom .

Primary Examiner—Nicholas P. Godici
Assistant Examiner—Samuel M. Heinrich
Attorney, Agent, or Firm—Oliff & Berridge

[57] ABSTRACT

A mechanism for use in linear friction welding has a drive-shaft (10) rotatable about a first longitudinal axis (12). An eccentric portion (10A) for locating a cam member (18) has a second longitudinal axis (16) spaced a distance d from the longitudinal axis (12) of the drive-shaft (10). The cam member (18) has a third longitudinal axis (20) spaced distance d from the second axis (16) of the cam member (18). A connecting-rod (24) is located via a big-end bearing (26) on the periphery of the cam member (18). When the drive-shaft is rotated with the third axis (20) of the cam member (18) displaced from the longitudinal axis (12) the connecting-rod reciprocates. If the cam member (18) is rotated about the second axis (16) of the eccentric portion (10A) until the longitudinal axis (12) and the third axis (20) of the cam member (18) are coincident the connecting-rod stops reciprocating.

7 Claims, 3 Drawing Sheets

FRICTION WELDER MECHANISM

This invention relates to a friction welder mechanism. More particularly, the invention relates to a mechanism for translating rotational movement of a drive-shaft into reciprocating motion of a connecting-rod with the facility to vary the stroke or amplitude from a maximum value to zero.

Friction welding is well known and relies on the creation of heat by rubbing two components together so that they may be permanently bonded together when the rubbing is stopped. Normally, rubbing is achieved by rotating one component relative to another fixed component about a fixed axis, or about an orbiting axis.

In some welding applications it is undesirable, or impossible, to rotate one component relative to another. Instead, it is more convenient to rub along a straight or arcuate path in a reciprocating manner. This type of welding is often referred to as linear friction welding.

It is an object of this invention to provide a mechanism for linear friction welding.

According to the invention a friction welder mechanism comprises:

a drive shaft mounted in bearings for rotation about a first longitudinal axis, and provided with eccentric location means having a receiving surface which is circular about a second longitudinal axis but laterally offset therefrom by a distance d;

A first cam member having a first circular surface corresponding to the circular receiving surface of the drive-shaft location means, whereby the cam member is located on the drive-shaft and is rotatable relative thereto about the second longitudinal axis, the cam member further comprising a peripheral surface which is circular about a third longitudinal axis which is parallel to the first and second longitudinal axes and is laterally offset from the second longitudinal axis by the distance d;

a connecting-rod located via a big-end bearing on the circular peripheral surface of the cam member and comprising a component holding fixture for holding a component to be welding and for urging it into frictional contact with a stationary component to be welded;

means for rotating the drive-shaft and cam member; and means for rotating the cam member relative to the drive-shaft.

A friction welder mechanism according to the invention provides a crank with an infinitely adjustable throw from zero to four times the distance d. Adjustment is made by rotating the cam member about the second longitudinal axis. The throw is zero when the first and third axes coincide, and at a maximum when the third axis is a distance 2d from the first axis.

The invention will now be described in detail by way of examples with reference to the accompanying drawings in which.

Figure 2:
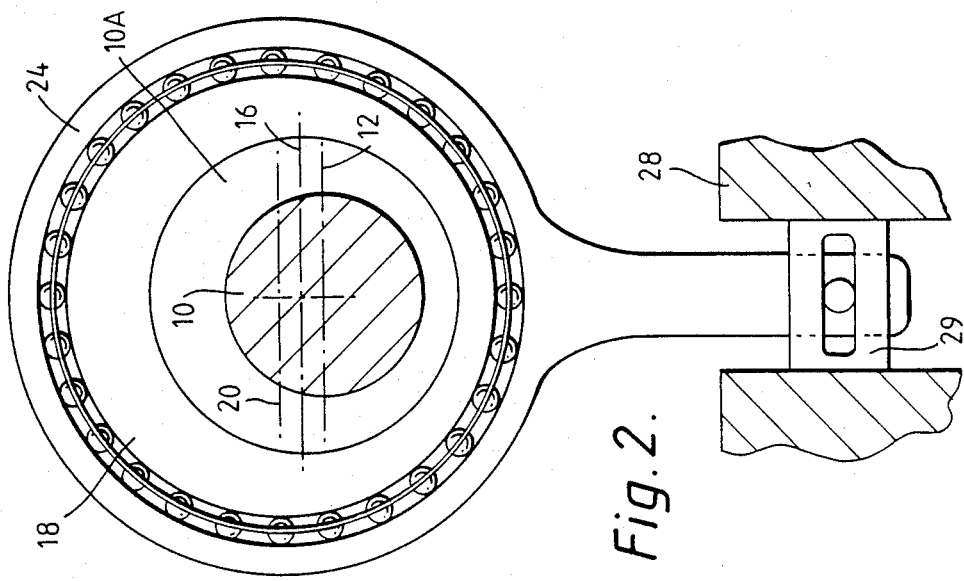
FIGS. 1 and 2 depict one type of mechanism according to the invention.
Figure 1:
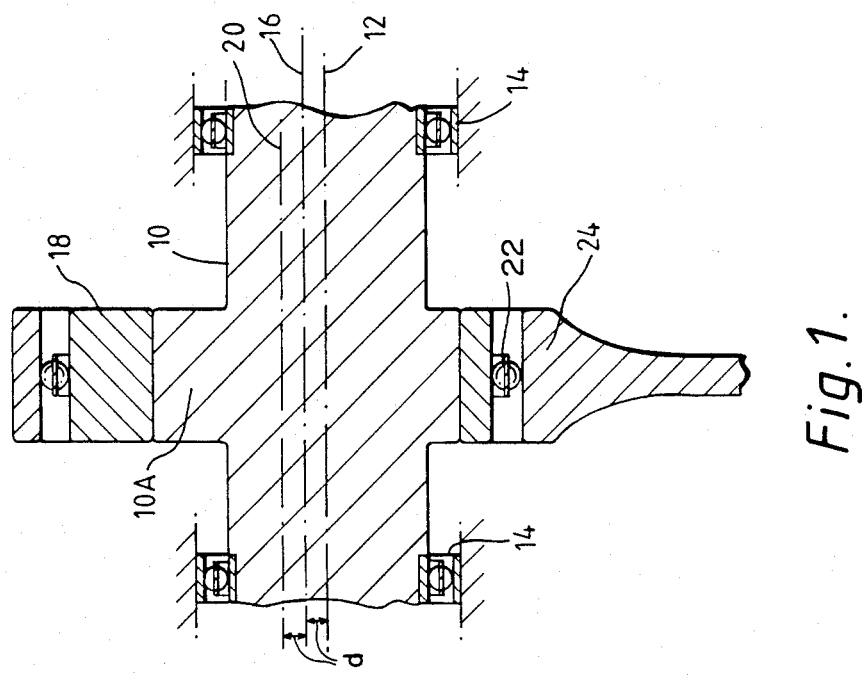

Referring to FIGS. 1 and 2: a drive-shaft 10 is rotatable about a longitudinal axis 12 and located in space by bearings 14. An eccentric portion 10A of the drive-shaft 10 has a circular peripheral receiving surface about a second longitudinal axis 16 which is laterally spaced a distance d from the rotational axis 12. Located on the eccentric portion 10A is an annular cam member 18 which has a circular outer profile surface about a third longitudinal axis 20 spaced a distance d from the second axis 16. A big end bearing 22 positions a connecting-rod 24 on the annular cam 18 and linear bearings 28 constrain a cross-head 29 from sideways movement.

Holding means (not shown) are provided on the cross-head 29 so that a component to be welded can be fixed thereto and can be oscillated along a predetermined substantially linear path with the said component urged into contact with a fixed second component to which the first component is to be welded.

The relationship between the eccentric portion 10A of the shaft and the annular cam 18 is such that they can be rotated together at the same speed (the drive shaft 10 driving the annular cam) in addition to the annular cam 18 being rotatable relative to the eccentric portion 10A while the drive-shaft is rotating at constant speed. Mechanisms for attaining this relationship are described below.

In operation, a component to be welded is attached to the connecting-rod 24. The drive-shaft 10 is then rotated at constant speed with the annular cam 18 positioned relative to the eccentric portion 10A as shown in FIGS. 1 and 2. The cumulative effect of the eccentric portion 10A and the annular cam is to cause reciprocating motion of the connecting-rod 24 of amplitude or stroke equal to four times the distance d. This motion provides for the component attached to the connecting-rod to be rubbed back and forth against the fixed component to provide for friction heating prior to welding. When the weld regions are at the required temperature, the annular cam 18 is rotated through 180°, or less (depending on the initial position), relative to the drive-shaft 10 (which is still rotating at a constant speed). The cam 18 rotates about axis 16 until axes 20 and 12 are coincident, whereupon the connecting-rod 24 no longer moves as all the eccentricities cancel out and the component is stationary and is welded by urging it into contact with the fixed component with the required force.

Figure 3:
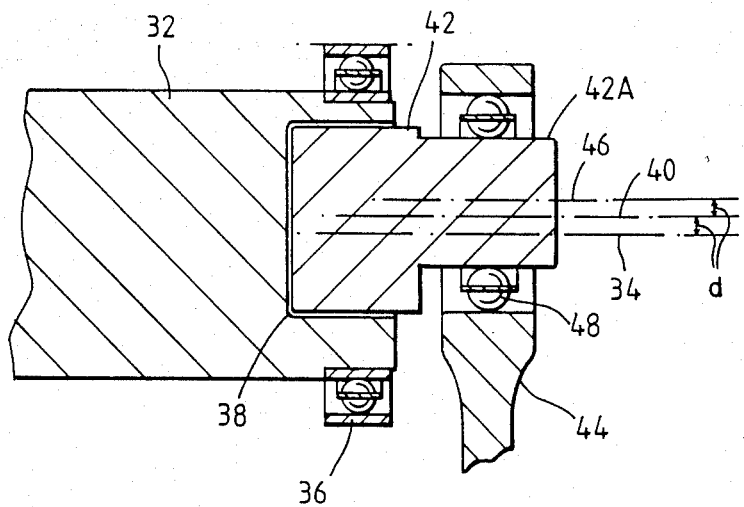
FIGS. 3 and 4 depict another example of the invention.
Figure 4:
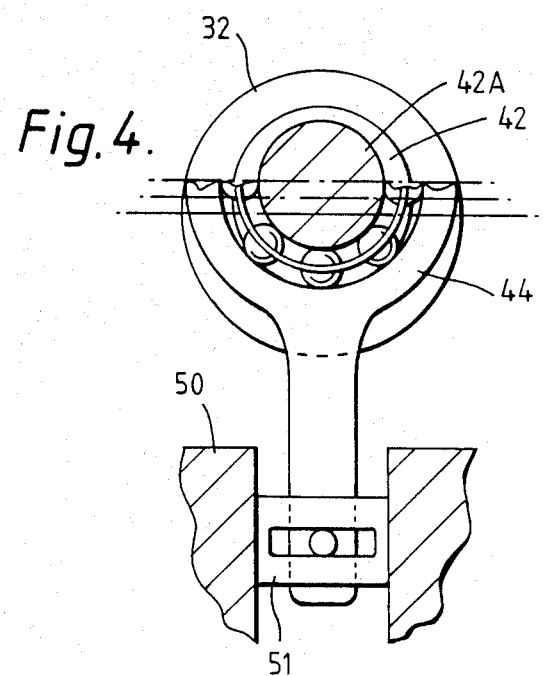

FIGS. 3 and 4 depict a similar version, but inside out, to the mechanism described above. In this case, a drive-shaft 32 has a longitudinal axis 34 about which it is rotatable, but fixed in space by bearings 36. The drive-shaft 32 has location means in the form of an eccentric bore 38 which is circular about a second longitudinal axis 40. Axes 34 and 40 are laterally offset from each other by distance d. A cam member spigot 42 fits into the eccentric bore 38. The cam member has an eccentric portion 42A of circular section about a third longitudinal axis 46, offset a lateral distance d from axis 40. A connecting-rod 44 and associated bearing 48 are located on the eccentric portion 42A. A linear bearing 50 prevents sideways movement of a cross-head 51 and holding means (not shown) are provided for clamping a component to be welded to the cross-head 51. As before, the relationship between the drive-shaft 32 and the cam 42 is such that they can be rotated together at the same speed (the drive-shaft 32 driving the cam 42) and the cam 42 can be rotated relative to the drive-shaft 32 while they are both rotating. In operation, a component to be welded is clamped to the connecting-rod 44 and urged into frictional contact with a fixed component and then the drive-shaft is rotated at a constant speed with the cam 42 positioned relative to the drive-shaft as shown in FIGS. 3 and 4. Rotation of the drive shaft 32 causes the connecting-rod 44 to reciprocate due to the combined effects of the eccentric bore 38 and the eccentric portion of the cam 42. The stroke or amplitude is four times d. This movement allows the component to be rubbed against the fixed component to produce heat by friction. When welding conditions are correct, the cam 42 is rotated through 180°, or less (depending on the initial position), relative to the drive-shaft 32 (which is still rotating at constant speed). The effect of this is to make axis 46 coincident with axis 34 thus cancelling out the effect of the eccentric bore 38 and the eccentric portion of the cam 42, whereupon the connecting rod 44 stops oscillating, and the component to be welded is urged towards the fixed component to effect welding.

Figure 5:
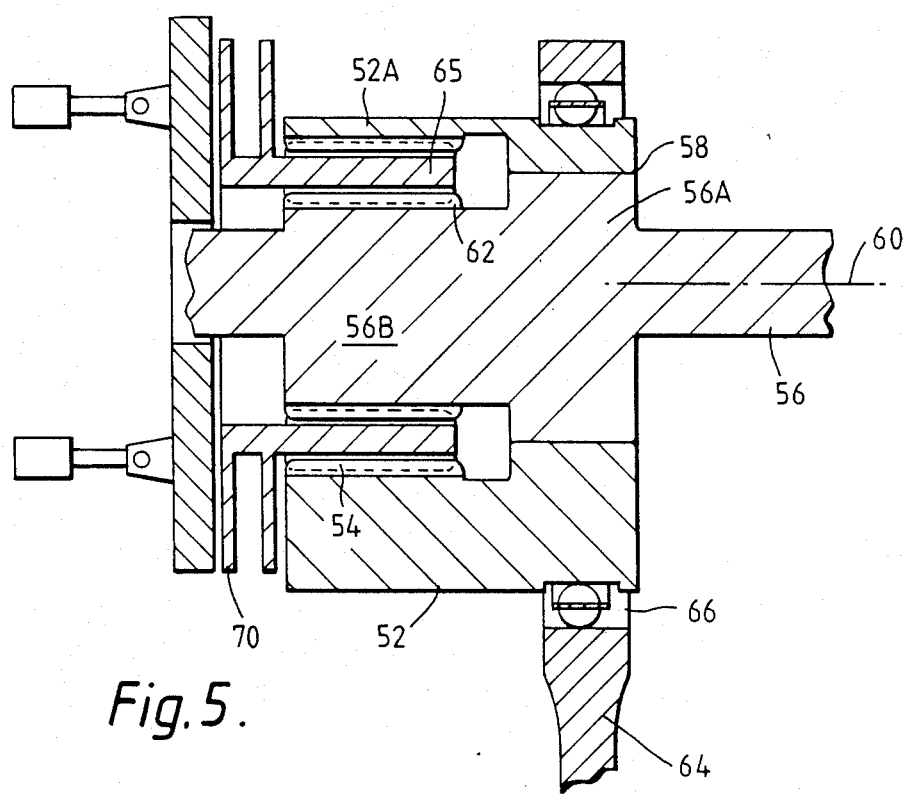
FIG. 5 shows a refinement of the mechanism depicted in FIGS. 1 and 2.

FIG. 5 shows one of many ways in which the drive-shaft and cam can be driven together but rotated relative to each other. The mechanism is essentially the same as that shown in FIGS. 1 and 2 with the following modifications. The annular cam 52 has an overhung portion 52A provided with an internal array of angled splines 54. The eccentric portion of drive-shaft 56 has two parts of identical section but different radius about a central axis. The larger part 56A locates the annular cam 52 with a plain bearing 58. The smaller part 56B has an array of external straight splines 62. An annular gear 65 is situated between the overhung portion 52A of the annular cam and the smallest part 56B of the eccentric portion of the drive-shaft. The annular gear has internal and external splines which engage those on the radially inner and outer parts. As before, a connecting-rod 64 is positioned by a big-end bearing 66 on the annular cam 52.

When the drive-shaft 56 is rotated about its longitudinal axis 60, the annular gear is driven via the splines, 62 on the eccentric portion 56B and itself drives the annular cam 52 with all parts rotating together at the same speed. To stop the connecting-rod 64 from reciprocating, a flange 70 on the annular gear is moved in a direction parallel with the longitudinal axis 60. The effect of having angled splines on one member and straight ones on the other is to cause the annular cam 52 to rotate relative to the drive-shaft 56 (which is being driven at a constant speed).

Figure 6:
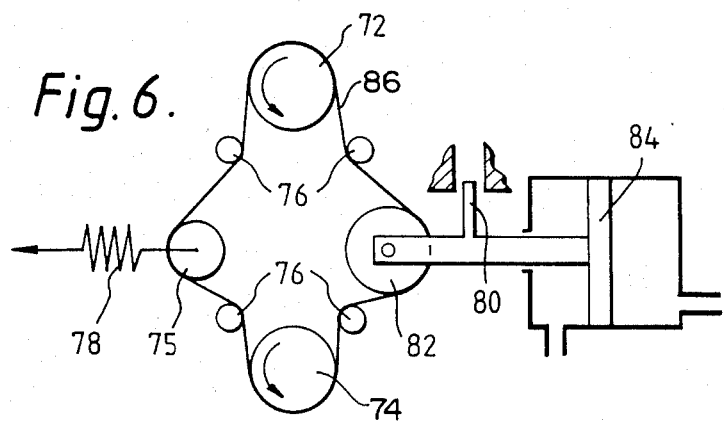
FIG. 6 depicts and example of part of a mechanism for use with the invention.

FIG. 6 shows a belt drive in which pulley 72 is connected to the drive-shaft 32 of the mechanism shown in FIGS. 3 and 4. Pulley 74 is connected to cam 42 while pulleys 76 are merely idlers. Spring 78 is a tensioner and pin 80 is a stop member. Pulley 82 is attached to a piston actuator 84 which can be made to move backward and forward by air pressure.

In operation, when the drive-shaft 32 is rotated the pulley 72 also rotates and drives the belt 86. Pulleys 72 and 74 are the same size and rotate together at the same speed. However, if the piston actuator 84 is displaced it speeds up one pulley and slows down the other thereby providing the necessary 180° of relative rotation, and thereby cancelling out the eccentricities.

We claim:

1. A friction welder mechanism for joining first and second components to be welded together by means of linear friction welding, comprising:

a drive shaft mounted in bearings for rotation about a first longitudinal axis;

an eccentric formed on said drive shaft, said eccentric being circular about a second longitudinal axis parallel with the first longitudinal axis but displaced therefrom by a predetermined eccentric distance;

an eccentric cam member rotatably mounted on said eccentric for rotation relative to the drive shaft about the second longitudinal axis, said eccentric cam member being formed with a peripheral surface which is circular about a third longitudinal axis laterally offset from the second longitudinal axis by the predetermined eccentric distance;

a connecting-rod located by a big-end bearing on the circular peripheral surface of the cam member and which is thereby made to reciprocate with an amplitude of movement corresponding to at most twice the predetermined eccentric distance upon rotation of the cam member and drive shaft, said connectingrod being provided with a component holding fixture for holding the first of the components to be welded and for urging it into frictional contact with the second component;

an annular gear interposed between the cam member and the eccentric on the drive shaft, and including first and second splines formed on said gear for meshing with corresponding first and second splines formed on the cam member and the eccentric, respectively, to couple them together for rotation, one of the first and second splines being formed with straight teeth and the other of the first and second splines being formed with inclined teeth so that axial movement of the gear along the first longitudinal axis causes rotation of the cam member relative to the eccentric on the drive shaft to vary and cancel the combined eccentric distances so that during operation of the mechanism the amplitude of movement of the component holding fixture on the connecting rod may be varied and reduced to zero by the axial movement of the said annular gear.

2. A friction welder mechanism according to claim 1 wherein the eccentric on the drive-shaft comprise an eccentric cam ..

3. A friction welder mechanism according to claim 1 wherein the eccentric on the drive-shaft comprise an eccentric hole bored in the drive-shaft.

4. A friction welder mechanism according to claim 2 wherein the eccentric cam member is an annular sleeve which is dimensioned to slidably fit over the eccentric on the drive-shaft.

5. A friction welder mechanism according to claim 3 wherein the eccentric cam member comprises a spigot adapted for location in the eccentric hole bored in the drive-shaft and a cam portion attached thereto on which the circular peripheral surface is formed.

6. A friction welder mechanism according to claim 1 wherein the connecting-rod is constrained from sideways movement by linear bearing means.

7. A friction welder mechanism according to claim 1 further comprising means for rotating the eccentric cam member relative to the drive-shaft, said means comprising a first pulley attached to the cam member, a second pulley connected to the drive shaft, a third pulley attached to tensioner means and a fourth pulley attached to an actuator means;

whereby a drive belt or chain causes rotation of the cam member when the drive-shaft is rotated and displacement of the fourth pulley by the actuator means causes relative rotation of the cam member with respect to the drive shaft.

* * * * *